(12) United States Patent
Jost

(10) Patent No.: US 6,832,762 B2
(45) Date of Patent: Dec. 21, 2004

(54) SEAL FOR MEDIUM-CONDUCTING COMPONENTS

(75) Inventor: Harry Jost, Knittlingen (DE)

(73) Assignee: Neumo GmbH & Co. KG (DE)

( * ) Notice: Subject to any disclaimer, the term of this patent is extended or adjusted under 35 U.S.C. 154(b) by 0 days.

(21) Appl. No.: 10/031,160

(22) PCT Filed: May 9, 2001

(86) PCT No.: PCT/EP01/05233
§ 371 (c)(1), (2), (4) Date: Apr. 12, 2002

(87) PCT Pub. No.: WO01/86177
PCT Pub. Date: Nov. 15, 2001

(65) Prior Publication Data
US 2002/0180162 A1 Dec. 5, 2002

(30) Foreign Application Priority Data
May 10, 2000 (DE) .......................... 100 22 515

(51) Int. Cl.[7] .............................................. F16L 25/00
(52) U.S. Cl. ....................................... 277/602; 285/328
(58) Field of Search ................................ 277/602, 606, 277/622, 623; 285/354, 328

(56) References Cited

U.S. PATENT DOCUMENTS

| | | | | |
|---|---|---|---|---|
| 1,913,246 A | * | 6/1933 | Saine ........................ 285/334.4 |
| 2,027,176 A | | 1/1936 | King |
| 3,515,415 A | * | 6/1970 | Clark ........................... 285/354 |
| 3,870,351 A | * | 3/1975 | Matsuki ....................... 285/334 |
| 4,316,624 A | * | 2/1982 | Davlin ..................... 285/141.1 |
| 4,384,737 A | * | 5/1983 | Reusser ........................ 285/334 |
| 4,428,603 A | | 1/1984 | Davlin |
| 4,555,129 A | * | 11/1985 | Davlin ............................ 285/3 |
| 4,611,838 A | * | 9/1986 | Heilmann et al. ........... 285/331 |
| 4,659,116 A | * | 4/1987 | Cameron ...................... 285/27 |
| 4,732,416 A | * | 3/1988 | Dearden et al. ............. 285/333 |
| RE34,114 E | * | 10/1992 | Lindner ....................... 417/500 |
| 5,230,540 A | | 7/1993 | Lewis et al. |
| 5,340,163 A | * | 8/1994 | Merrer et al. ................. 285/93 |
| 5,553,902 A | * | 9/1996 | Powers ....................... 285/350 |
| 5,645,301 A | * | 7/1997 | Kingsford et al. ............. 285/14 |
| 5,725,259 A | * | 3/1998 | Dials ........................ 285/334.4 |
| 5,765,836 A | * | 6/1998 | Banker et al. ............... 277/603 |
| 6,116,658 A | * | 9/2000 | Bohlen ........................ 285/330 |
| 6,412,831 B1 | * | 7/2002 | Noel et al. ................... 285/334 |
| 6,485,063 B1 | * | 11/2002 | Olivier ........................ 285/333 |

FOREIGN PATENT DOCUMENTS

| | | |
|---|---|---|
| AT | 50 628 | 8/1990 |
| DE | 828 175 | 1/1952 |
| DE | 866 423 | 2/1953 |
| DE | 24 30 627 | 1/1976 |
| DE | 31 05395 | 4/1982 |
| FR | 7 67 020 | 7/1934 |
| FR | 1599688 | 8/1970 |
| GB | 487796 | 6/1938 |

* cited by examiner

Primary Examiner—J J Swann
Assistant Examiner—Thomas Ho
(74) Attorney, Agent, or Firm—Akerman Senterfitt

(57) ABSTRACT

The invention relates to a seal for medium-conducting components, whereby the components (12, 13) comprise sealing surfaces (20, 25), which are exactly complementary to each other and which are directly pressed together to form a gap-free seal. The contact surfaces (44) between the sealing surfaces is limited to a narrow region directly adjacent to the medium cavity (19). Said gap-free and dead-volume-free seal can be used, for example in germfree, or sterile processes.

21 Claims, 4 Drawing Sheets

SEAL FOR MEDIUM-CONDUCTING COMPONENTS

BACKGROUND OF THE INVENTION

The invention relates to a sealing system for media-carrying parts according to the preamble of claim 1.

In order to meet the increased demands made as regards hygiene and product quality, such as e.g. the reduction in the quantity of preservatives in cosmetic products and foods, the increase in the keeping quality of dairy products and beverages, as well as in the pharmaceutical and other industries, where GMP (Good Manufacturing Practice) is a prerequisite, corresponding installations, components and parts are required, which satisfy the requirements as regards low germ content and sterility.

It has been found that in particular the sealing system of the components or the like is a key aspect of such processes. As a result of ageing phenomena, external influences such as temperature, attacks by aggressive media, the seals are often damaged to such an extent that at the seal zone between the components dead volumes, clearances, etc. form, which are potential contamination sources, so that it is possible for germs, bacteria or the like to be deposited there. Thus, the nature of the seal is particularly critical. Whereas on the one hand a profile seal has been discussed, other users favour a sealing system using an O-ring.

BRIEF SUMMARY OF THE INVENTION

The problem of the invention is to provide a detachable sealing system for media-carrying parts, which differs from conventional seals in that it has a better sealing action and consequently satisfies the constantly increasing demands made in low-germ or sterile processes.

This problem is solved by the features of claim 1. Further developments of the invention form the subject matter of the subclaims.

The invention proposes that the media-carrying parts have precisely complimentary sealing surfaces to one another and which are directly pressed against one another for forming a clearance-free seal. The contact surface between the sealing surfaces is limited to a narrow area directly adjacent to the media area. Unlike in the case of conventional seals, the sealing system according to the invention has no additional sealing element, such as a sealing ring or the like. Preferably it is a purely "metal on metal seal" made from the same basic material and whose sealing action is brought about by the characteristically formed sealing surfaces on both parts, when the latter are braced against one another. A surface treatment or coating is possible, but not absolutely necessary. The complimentary sealing surfaces act in the manner of a plug and a die, which engage in one another. As opposed to conventional seals, where as a result of the material thickness of the sealing element a clearance always forms towards the media area, the seal in the present case is free from clearances. In particular the sealing clearances on conventional seals constitute potential contamination sources, because the sealing element can deform through the clearance into the media area, where a bead-like projection forms, on which residues in the form of puddles can e.g. form on emptying media-carrying pipelines and which constitute an ideal nutrient medium for bacteria or germs. This problem is obviated by the clearance-free seal of the connection according to the invention. In general, the sealing elements of conventional seals are foreign bodies, which behave quite differently to the remaining media-carrying parts. They are e.g. permanently exposed to the medium, e.g. gases or liquids and can consequently be attacked or swell, which leads to a reduction in the sealing action. They are also exposed to constant temperature changes, e.g. if the installation is steam-sterilized. For example, conventional sealing rings are only allowed up to approximately 135° C. in low-germ or sterile processes. However, in the process according to the invention the seal is formed by the media-carrying parts, so that a swelling or the like is impossible.

Another advantage of the sealing system requiring no elastomeric seals is that in the case of thermal sterilization the seal does not act as an insulator and the sterilization heat in the minimum time reaches all necessary areas by heat conduction.

Media-carrying parts in the sense of the present application are understood to be all devices in contact with or conveying media, such as liquids or gases and which can be devices in the form of pipes, containers, fittings, valves, etc. The connections for media-carrying parts are understood to mean connections between the pipes, containers, etc. The sealing system can be a joint connection between two pipes, a pipe and a container, etc. Such connections can be screw, flange, clamp or clip connections or the like. However, it is also possible to use the sealing system for valves or the like, e.g. as a valve housing seal and/or as a spindle seal.

The contact surface between the sealing surfaces of the parts is limited to an area, whose size is very small compared with the nominal width of the sealing system. The nominal width is the internal diameter of the medium area of the sealing system in millimeters and which is bounded by the medium area wall. The width of the contact surface can be a $\frac{1}{5,000}$ to $\frac{1}{50}$, preferably $\frac{1}{1,000}$ to $\frac{1}{250}$ of the nominal width of the sealing system, e.g. 0.01 to 1 mm, preferably 0.05 to 0.2 mm. This area is directly adjacent to the media area and the sealing action of the seal consequently starts directly at the transition between the contact surface and the media area.

As a result of the small dimensions of the contact surface the specific sealing pressure on pressing together the parts, is preferably in the elastic deformation range of the material of the parts. It can be close to the yield point (0.2% yield strength) of the material of the parts, e.g. 20 to 80% of the yield point value. The sealing pressure value can be approximately 30 to 140 Newton/$mm^2$. There is no cold welding of the parts, even under a high contact pressure. However, certain plastic deformations, e.g. in parts of the surfaces are possible.

According to a further development of the invention the sealing surfaces can have a guide, which acts transversely to the media area, e.g. in the radial direction. As a guide, particularly in the radial direction, are preferably provided the profiled sealing surfaces of the parts. For this purpose the cross-sections of the sealing surfaces preferably have a complimentary curved profile. The profiles can e.g. be in the form of a bead and groove. However, preferably these sealing surfaces have two complimentary S-shaped profiles engaging in one another on bracing the parts. It is also possible to use interengaging trapezoidal profiles. The sealing surfaces can consequently form a type of ring spherical seal.

In a further development of the invention the sealing surfaces can be designed in such a way that the specific sealing pressure decreases from the intersection line of the sealing gap with the wall of the media area. This makes it possible to prevent the sealing gap "beaking" at said intersection line leading to the formation of a clearance in which germs or bacteria could collect. As a result of the adjustable contour of the sealing surfaces it is possible to interchange parts without leaks occurring. In particular, an addition of tolerances in the dimensions of the sealing surfaces does not give rise to leaks. The sealing gap is always directly tight at its intersection line with the media area. The sealing surfaces are constructed as a type of sealing lip with a complimentary half-recess.

Adjacent to the contact surface formed by the two sealing surfaces can be surface portions of both parts cut free from the contact surface, which i.e. are not in stop form on bracing the parts. However, these can serve as reserve contact surfaces, if the contact surface is enlarged away from the media area under the sealing pressure. Therefore the free-cut away from the contact surface should gradually increase. These surface portions are also preferably constructed complimentary to one another. They can pass into two plane-parallel surfaces, but preferably are also curved and preferably form an annular clearance. The width of the annular clearance can e.g. be $1/5{,}000$ to $1/500$, particularly $3/5{,}000$ to $7/5{,}000$ of the nominal width of the sealing system.

In a further development of the invention guide portions can be provided transversely and spaced from the sealing surfaces for the precentring of the two parts. The guide portions can e.g. be axially directed guide surfaces. At the two guide portions, particularly at the transition of the guide portions into the surface areas forming the reserve contact surfaces and at an end opposite the same, said guide portions can have insertion bevels, which are used for bringing together the two parts. The insertion bevels can e.g. be formed by chamfers. Between the two guide portions there is preferably a guide clearance, e.g. an axial separating gap, which makes it possible to orient the two parts in accurately fitting manner with respect to one another on pressing together the sealing surfaces.

In particularly preferred manner the dimension of the contact surface, particularly the sealing lip adjacent to the media area with its complimentary half-recess is dimensioned in such a way that the sealing chamfer at the transition to the media area wall is aligned in projection-free manner therewith. As a result of the clearance-free seal between aligned wall portions a detachable connection is possible, whose sealing gap is scarcely visible or tangible in the media area. Apart from ideal conditions for a low line resistance, a residue-free cleaning and emptying are possible.

According to a further development of the invention a clearance is formed between the parts in the bracing direction. The clearance is in particular so large that on bracing the sealing system up to the closing of the clearance, the sealing pressure is built up by the elastic deformation of the parts. The clearance width can be approximately $1/5{,}000$ to $1/100$, preferably $1/100$ to $3/100$ of the nominal width of the sealing system. For this purpose between the sealing surface and a bracing or clamping device bringing about the bracing of the parts, e.g. tightening screws, clamps, etc. can be provided a portion of the parts, e.g. a ring or tube-like projection, which is elastically deformable. Therefore the presetting of the contact pressure is essentially determined by the size of the clearance, the length of the projection, the modulus of elasticity of the material and the flexibility of the parts.

The sealing system can also be a flange connection, in which the contact pressure is produced by screwing the flanges. Sealing systems constructed as joint connections are preferably welded in a pipeline or to a container, orbital welding being particularly suitable. The weld point is preferably approximately 35 to 50 mm from the sealing surfaces of the sealing system. This is sufficient to prevent a temperature-deformation at the sealing surfaces. In addition, the relatively large diameter and the relatively high thermal capacitance inhibits heat conduction to the sealing surface. Particularly for high-grade sealing systems the heat conduction from the weld point in the direction of the sealing surfaces is low, because the high-grade steel acts as an insulator.

The clearance-free seal can be used for the connection of two pipe or container parts. However, it can also be used for sealing valve components, e.g. for sealing a metal valve bellows.

The parts forming the sealing system and the sealing surfaces can be made from a hard material, e.g. stainless steel. However, other materials are also suitable from which all the parts can be produced, e.g. ceramic or plastics materials.

The invention also covers a process for the production of a sealing system according to one of the claims 1 to 12. The process is characterized in that the sealing surfaces can be produced by precision profile turning by means of complimentary profile cutting edges or bits. The reserve sealing surfaces can be produced at the same time using the same profile bits. The turning method can e.g. be face-turning, in which a surface located perpendicular to the workpiece rotation axis can be worked.

Plastic sealing systems are preferably produced by injection moulding. The relatively small sealing surfaces can either be moulded at the same time through the use of precision injection moulding processes or can be made subsequently by precision working.

These and further features can be gathered from the claims, description and drawings and the individual features, both singly and in subcombinations, can be implemented in an embodiment of the invention and in other fields and can represent advantageous, independently protectable constructions, for which protection is claimed here. The subdivision of the application into individual sections and the subheadings in no way restrict the general validity of the statements made thereunder.

BRIEF DESCRIPTION OF THE DRAWINGS

An embodiment of the invention is described hereinafter relative to the attached drawings, wherein show.

DETAILED DESCRIPTION OF THE EMBODIMENTS

The sealing system according to the invention is to be illustrated in exemplified manner by means of a screw coupling 11. However other sealing system types are possible, e.g. flange, clamp or clip seals.

Figure 1:
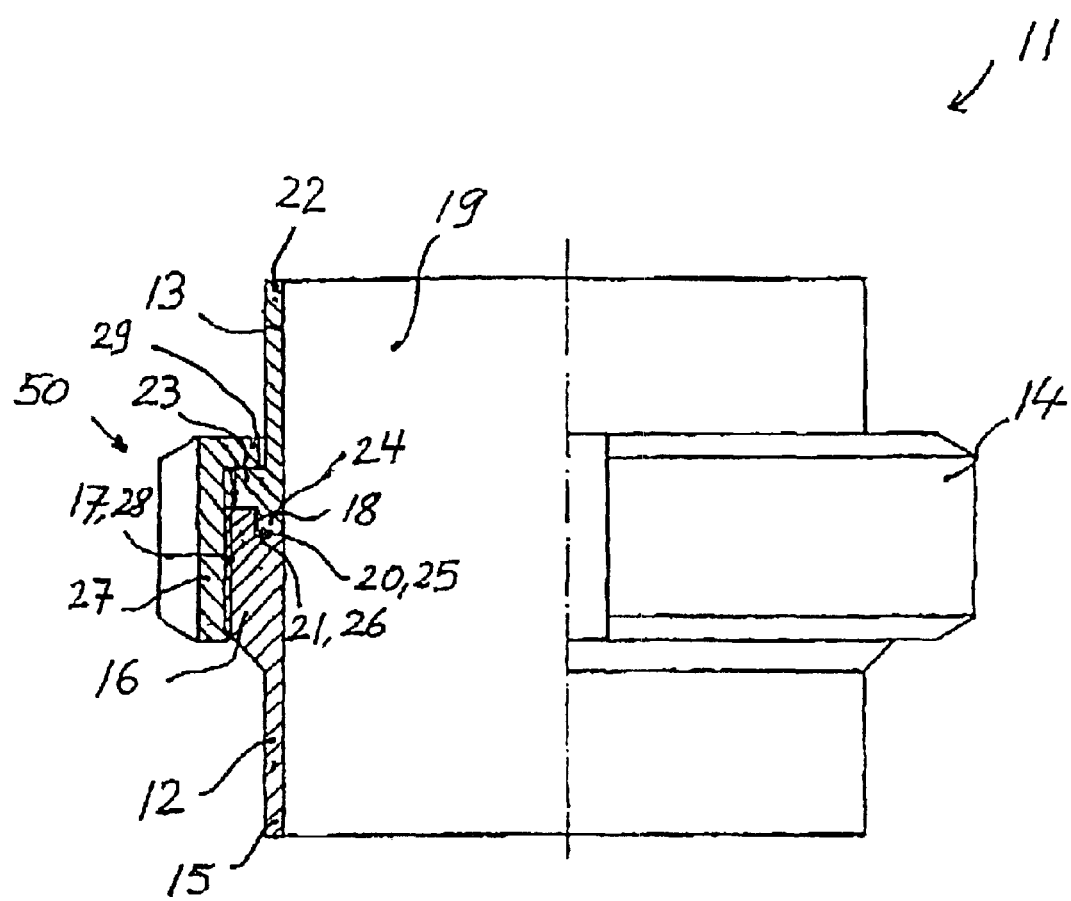
FIG. 1 A part sectional view through the connection.

FIG. 1 shows a screw coupling 11 such as is in particular used for the detachable connection of two pipes. The screw coupling 11 comprises three parts, namely a threaded connector 12, a collar connector 13 and a clamping device 50 in the form of a box nut 14. The threaded connector 12, collar connector 13 and box nut 14 are preferably made from stainless steel, e.g. a chrome-nickel-molybdenum steel. It is e.g. possible to use austenitic chrome-nickel-molybdenum steels of material numbers 1.4404 or 1.4435 with a 0.2% yield strength ($Rp_{0.2}$) at 50° C. of 182 mm². The standard nominal widths of such sealing systems are 6 to 100 mm (DN 6 to 100). The sealing systems are conventionally designed for operating pressures up to 60 bar. As a function of the diameters, they can also be designed for much higher pressures. The surfaces of the sealing systems are suitable for cleaning-in-place (CIP) cleaning and sterilization-in-place (SIP) sterilization.

Figure 6:
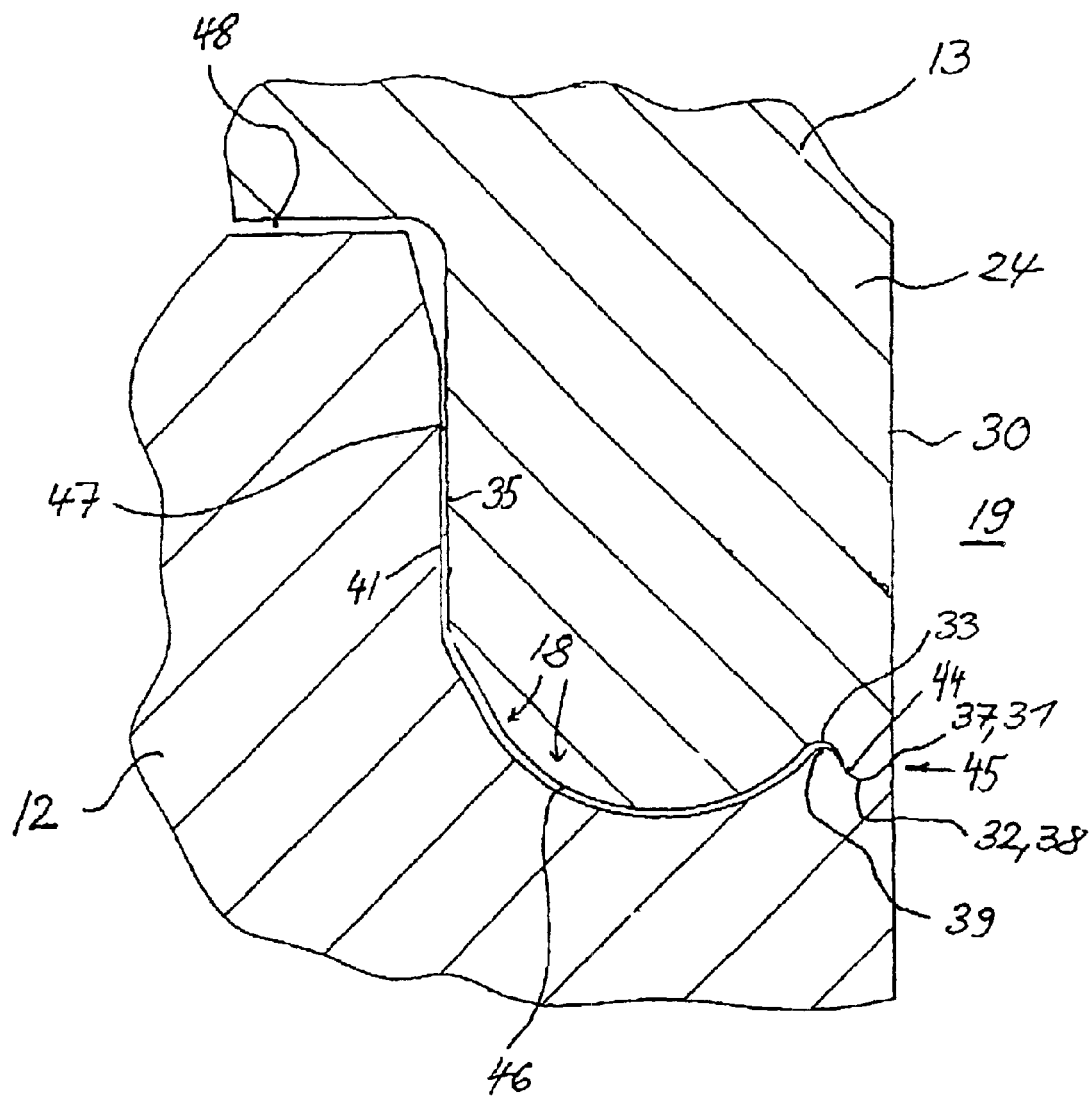
FIG. 6 A part sectional representation of details X of FIG. 1 and Z of FIG. 3 with the connection parts joined together.

The threaded connector 12 comprises a pipe section 15, to which is connected a larger diameter threaded section 16. The pipe section 15 is welded to a not shown pipe. Orbital welding has proved to be a suitable welding process for sterile or low-germ processes. The transition between the threaded section 16 and pipe section 15 is conically rounded. The threaded section 16 has an external thread 17, which extends from the transition between the pipe section 15 and threaded section 16 to the end of the latter. At the threaded section-side end of the threaded connector 12 is formed a radially circumferential slit 18, which is directed towards the media area 19, i.e. towards the pipe interior. At the foot of the slit 18 are formed the sealing surfaces 20 and reserve sealing surfaces 21 of the threaded connector (FIG. 6).

The collar connector 13 also has a pipe section 22, as well as a flange section 23. The pipe section 23 of the collar connector is also welded to a not shown pipe. The flange section 23 is a step-like widening on the outer surface of the pipe section 22. At the flange-side end of the collar connector, the flange section 23 has a radially circumferential, annular projection 24. At the face of the projection 24 are formed the sealing surface 25 and the reserve sealing surface 26 of the collar connector.

The clamping or bracing device 50 for joining the parts is a box nut 14 in the present embodiment. It is used for bracing the threaded and collar connectors 12, 13. It has a threaded section 27 with an internal thread 28, as well as a stop collar 29 for fixing the box nut 14 to the collar connector 13. The internal thread 28 has a hard metal coating in order to prevent corrosion on screwing the box nut 14 to the threaded connector 12. In place of a threaded bracing device it is also possible to use flanges with clamping bolts, bracing clips, hydraulic clamping devices, etc.

Figure 2:
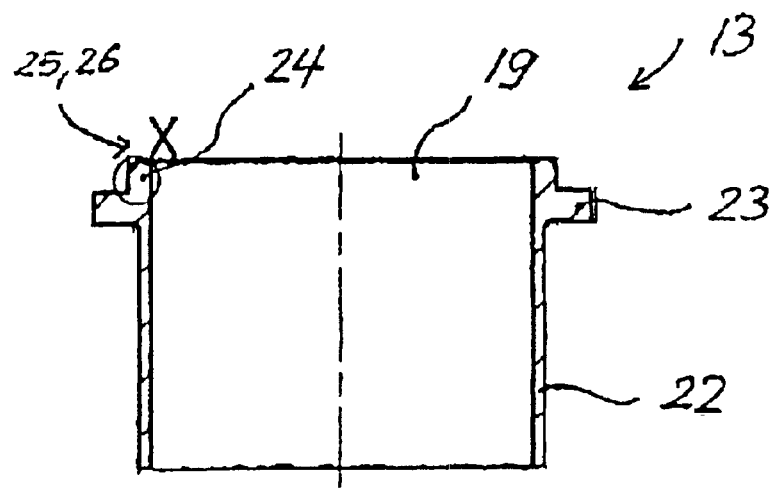
FIG. 2 A longitudinal section through a first part of the connection.
Figure 3:
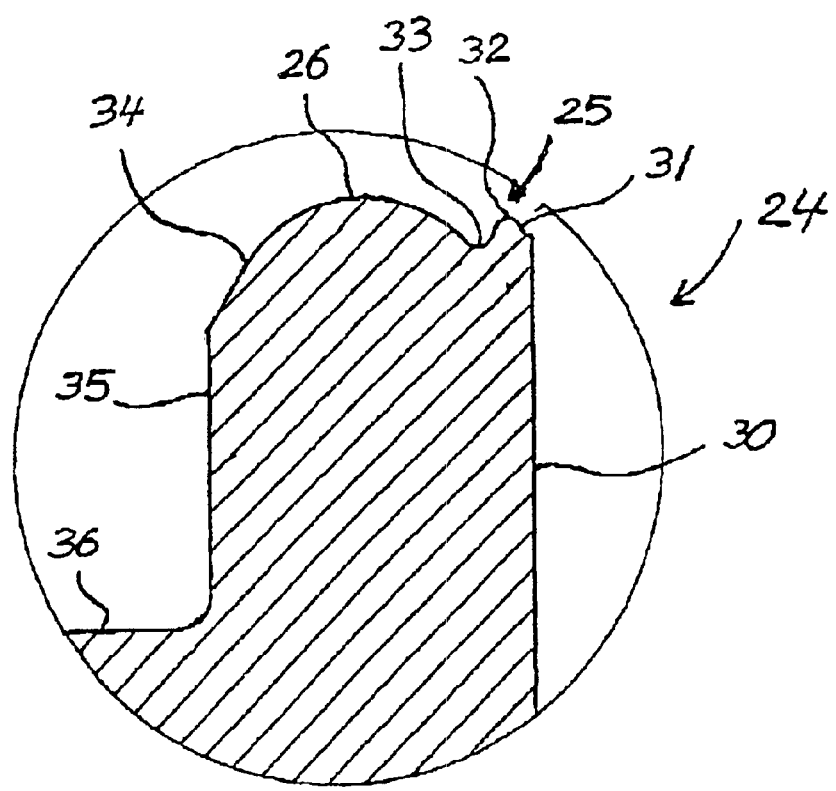
FIG. 3 A larger scale representation of detail X of FIG. 2.
Figure 5:
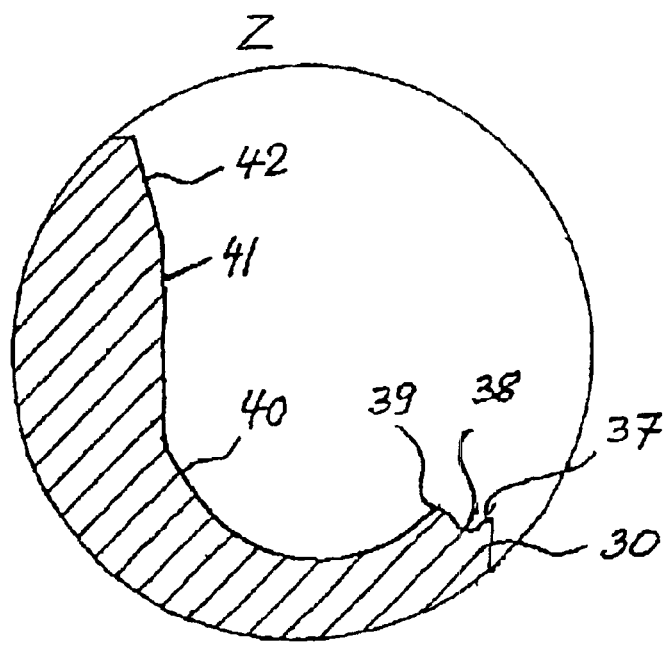
FIG. 5 A larger scale representation of detail Z in FIG. 4.

FIGS. 2 and 5 show the collar connector 13 separately. The projection 24 of the collar connector 13 has a profiled face, on which are formed the sealing surface 25 and reserve sealing surface of the collar connector 13 (FIG. 3).

The sealing surface 25 has a curved profile in the form of a S-shape. Adjacent to the media area wall 30 is a half-recess 31, which passes into a bead-like protuberance 32. In turn, the protuberance 32 passes at its side remote form the media area 19 into a groove-like depression 33 to which is adjacent the reserve sealing surface 26. The reserve sealing surface 26 is a semicircular protuberance which, at its end remote from the media area 19, passes into a planar insertion bevel 34. The dimension of the reserve sealing surface 26 is approximately 5 to 10 times larger than the dimension of the sealing surface 25. Adjacent to the insertion bevel 34 is provided a guide section 36 of projection 24 positioned axially to the media area wall 35 and passing into a radial section 37 of the flange section 23 of the collar connector 13.

Figure 4:
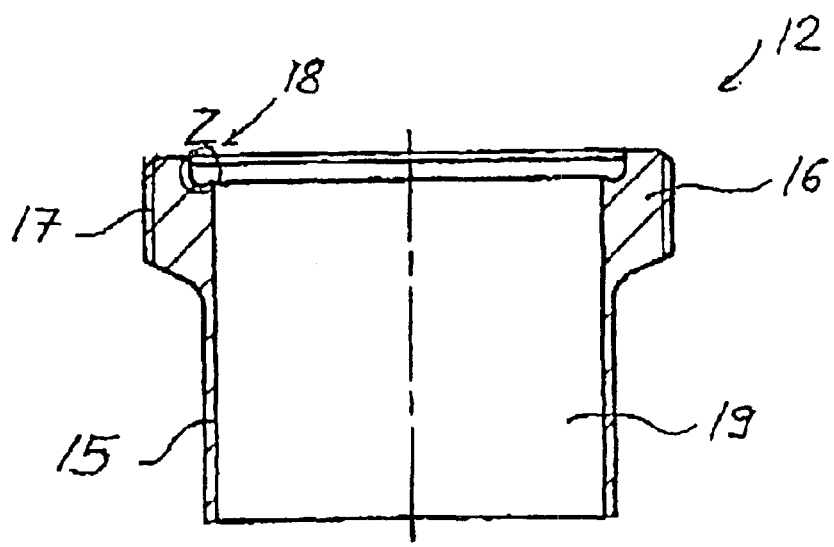
FIG. 4 A longitudinal section through a second part of the connection.

FIG. 4 separately shows the threaded connector 12. At the foot of the slit 18 are formed sealing or reserve sealing surfaces 20, 21 of the threaded connector 12 complimentary to the sealing surface 25 or reserve sealing surface 26 of the collar connector 13 (FIG. 5). The sealing surface 20 also has a S-shaped profile. Adjacent to the media area wall 30 is a sealing lip 37 complimentary to the half-recess 31 of the collar connector 13 and which passes into a groove-like depression 38, which is complimentary to the bead-like protuberance 32 of the collar connector. The groove-like depression 38 at its end remote from the media area 19 passes into a bead-like protuberance 39 complimentary to the groove-like depression 33 on the collar connector. The reserve sealing surface 21 is adjacent to the bead-like protuberance 39. The reserve sealing surface 21 is a semicircular depression, which at its end remote from the media area passes into a planar insertion bevel 40. The dimension of the reserve sealing surface 21 at the threaded connector 12 is also approximately 5 to 10 times larger than the dimension of the sealing surface 20 at the threaded connector 12. Adjacent to the insertion bevel 40 is a guide section 41 of slit 18 positioned axially to the media area wall 30. At its end facing the reserve sealing surface 21, the guide section 41 passes through a further insertion bevel 42 into a radial section 43 of the threaded section 16 of the threaded connector 12.

The sealing surfaces 20, 25 and the reserve sealing surfaces 21, 26 on the collar or threaded connectors 12, 13 are produced by a precision turning process, e.g. by precision face-turning. The cutting tool used can be in the form of a small flip or turnover plate, e.g. made from hard metal, which has cutting edges with the contour of the S-shaped sealing surface 20, 25 and semicircular reserve sealing surface 21, 26 and which cuts said contour into the face of the projection 24 of the collar connector 13 and to the foot of the slit 18 of the threaded connector 12. The complimentary profiled tool bits are shaped by profile grinding wheels.

FIG. 6 shows the projection 24 of the collar connector 13 engaging in the slit 18 of the threaded connector 12, when the collar connector 13 and threaded connector 12 are brought together. A contact surface 44 immediately adjacent to the media area wall 30 is formed between the sealing surfaces 20, 24 of the threaded and collar connector 13. The contact surface 44 begins directly at the intersection line between the sealing gap 45 formed by the two sealing surfaces 20, 25 with the media area wall 30. The sealing lip 37 of the threaded connector 12 with the complimentary half-recess 31 of the collar connector 13 engages in stop manner. The bead-like protuberance 32 of the collar connector 13 and the complimentary groove-like depression 38 of the threaded connector 12 also engage in stop manner and consequently form the second portion of the contact surface 44. The groove-like depression 33 of the collar connector 13 and the bead-like protuberance 39 of the threaded connector 12 are not completely in stop engagement, but are instead increasingly spaced from the media area 19 on their media-side, remote flanks and consequently also form reserve sealing surfaces. For a nominal width of 50 mm, the size of the contact surface 44 is e.g. approximately 0.1 mm.

The semicircular reserve sealing surfaces 21, 26 are not in stop engagement, but instead form between them an annular clearance 46. The width of the annular clearance 46 is approximately 0.05 mm in the embodiment described.

To the annular clearance 46 is axially towards the media area wall 30, a separating gap 47, which is formed by the two guide sections 35, 41 of the threaded or collar connector 12, 13. The width of the separating gap 47 is about the same or slightly less than that of the annular clearance 46.

Adjacent to the separating gap 47 is a clearance 48 perpendicular to the media area wall 30 or radial to the pipe and which is used for bracing the threaded and collar connectors 12, 13. The width of this clearance 48 is e.g. approximately 0.1 mm for the nominal width DN50. The widths of the projection 24 of the collar connector 13 and the slit 18 of the threaded connector 12 are approximately 3 mm, e.g. with a nominal width of 50 mm.

Hereinafter is described a further embodiment, which is not shown in the drawings. The sealing system according to the invention can e.g. be used for sealing valves. In sterile technology, e.g. the rods of piston valves are sealed in substantially dead volume-free manner with respect to the reaction vessel by a bellows. Materials for such bellows can be metals or also Teflon (PTFE). The bellows is in turn sealed at a seat towards the piston valve rod and at the housing to the environment. In the case of metal bellows the sealing system at the seat and housing can be implemented by the sealing system according to the invention using two complimentary sealing surfaces, i.e. a profiled sealing surface on the piston valve rod or a profiled sealing surface on the housing cover. The sealing system of the valve body in the valve seat can also take place according to the invention and a pipeline system made entirely from one material, e.g. stainless steel can be formed.

FUNCTIONAL DESCRIPTION

In the case of the screw coupling 11 shown in FIGS. 1 to 5, firstly the collar connector 13 is mounted on the threaded connector 12. The guide section 35 of the projection 24 is guided by the guide section 41 of the threaded connector 12 and is radially precentred. On further bringing together the collar and threaded connectors 12, 13, the complimentary constructed, profiled sealing surfaces 20, 25 engage in one another, which brings about a further radial centring, thereby preventing damage to the precision worked sealing surfaces. The collar and threaded connectors 12, 13 are brought together until the sealing surfaces 20, 25 stop-engage on the end face of the projection 24 of the collar connector 13 and on the foot of the slit 18 of the threaded connector 12. The sealing surfaces 20, 25 form a contact surface 44 bringing about a seal towards the media area 19. As a result of the separating gap 47 between the guide sections 35, 41, the two sealing surfaces 20, 25 can be mutually oriented in accurate fitting manner. In the case of damage or deformations in the front area of the sealing gap 45, the contact surface 44 can migrate radially away from the media area 19 and can consequently be subject to automatic adjustment. This is helped if the sealing surfaces are profiled in such a way that they initially contact in the area adjacent to the media area, i.e. where the pressing action is greatest.

Thus, a contact surface can form between the reserve sealing surfaces 21, 26. If the sealing surfaces 20, 25 are stop-engaged and have been oriented, the bracing of the parts can commence. For this purpose the internal thread 28 of the box nut 14 is screwed onto the external thread 17 of the threaded connector 12. The pretension is set in that the clearance 28 between the radial sections 36, 43 of the collar and threaded connectors 13, 12 is closed and the projection 24 can elastically deform. The sealing surfaces 20, 25 are so mutually oriented that the maximum contact pressure occurs at the contact area between the sealing lip 37 and the half-recess 31, i.e. directly at the transition to the media area wall 30. In the described embodiment the contact pressure is approximately 140 N/mm$^2$. Due to the high contact or sealing pressure and the high precision working of the sealing surfaces with respect to the surface and radial orientation, particularly in the area of the sealing gap adjacent to the media area a clearance-free, i.e. gapless connection is formed. With respect to the roundness of the parts, a certain automatic adjustment can take place as a result of the profiling of the sealing surfaces.

What is claimed is:

1. A detachable sealing system for media-carrying parts comprising:

a seal adjacent to a wall of a media-carrying area, which seals the sealing system when the parts are braced against one another, wherein the parts have mutually precisely complimentary sealing surfaces having cross-sections with a mutually complementary S-shaped profile, which sealing surfaces are directly pressed onto one another to form a clearance-free seal at a contact surface, and wherein the contact surface between the sealing surfaces is limited to a narrow area directly adjacent to the media-carrying area, and has a width of $\frac{1}{5,000}$ to $\frac{1}{50}$ of a nominal width of the sealing system.

2. A detachable sealing system for media-carrying parts comprising:

a seal adjacent to a wall of a media-carrying area, which seals the sealing system when the parts are braced against one another, wherein the parts have mutually precisely complimentary sealing surfaces which are directly pressed onto one another to form a clearance-free seal at a contact surface, wherein the contact surface between the sealing surfaces is limited to a narrow area directly adjacent to the media-carrying area, and has a width of $\frac{1}{5,000}$ to $\frac{1}{50}$ of a nominal width of the sealing system, wherein guide sections are provided on both parts, the guide sections situated transversely to and spaced from the sealing surfaces, and wherein, for pre-centering of the two parts, the guide sections have at least one insertion bevel for bringing the two parts together, and a separating gap is formed between the guide sections for aligning the two parts before the sealing surfaces are pressed together, the sealing surfaces having a mutual guidance transverse to the media area walls and being, when pressed together, accurately fitting radially centered to each other, whereby the media-carrying area walls of both parts are truly aligned.

3. The sealing system according to claim 1, wherein the contact surface is loaded with a specific sealing pressure, which is only in an elastic deformation range of a material of which the parts consist.

4. The sealing system according to claim 1, wherein in addition to the sealing surfaces there is a mutual guidance transverse to the media area wall.

5. The sealing system according to claim 1, wherein the sealing surfaces are designed in such a way that a specific sealing pressure decreases from an intersection line of a sealing gap between the sealing surfaces with the media-carrying area wall.

6. The sealing system according to claim 1, wherein guide sections are provided on both parts, the guide sections situated transversely to and spaced from the sealing surfaces wherein, for pre-centering of the two parts, the guide sections have insertion bevels for bringing the two parts together, and a separating gap is formed between the guide sections for aligning the two parts before the sealing surfaces are pressed together.

7. The sealing system according to claim 1, wherein the media-carrying area walls of both parts are truly aligned.

8. The sealing system according to claim 1, wherein, adjacent to the media-carrying area wall, the sealing surface of one of the parts has a sealing lip projecting towards the other part and which is received in a corresponding half-recess on the sealing surface of the other past.

9. The sealing system according to claim 3, wherein the sealing pressure is predetermined by a stop provided by a clamping device.

10. The sealing system according to claim 1, further comprising stop faces between the parts, which form a clearance between the parts before bracing the parts together, whose width is sufficiently large that on bracing the sealing system up to the closing of the clearance, a sealing predetermined pressure is built up by the elastic deformation of the parts.

11. The sealing system according to claim 1, further comprising an elastically deformable portion of the parts interposed between a clamping device and the sealing surfaces.

12. The sealing system according to claim 1, wherein the sealing system is a joint connection between two media-carrying parts.

13. The sealing system according to claim 1, wherein the parts are made from an equally hard material.

14. A method for the manufacture of a sealing system according to claim 1, wherein the sealing surfaces are produced by profile precision turning by means of mutually complimentary profile cutting edges.

15. The sealing system according to claim 1, provided for aseptic applications.

16. A detachable sealing system for media-carrying parts comprising:

a seal adjacent to a wall of a media-carrying area, which seals the sealing system when the parts are braced against one another, wherein the parts have mutually precisely complimentary sealing surfaces which are directly pressed onto one another to form a clearance-free seal at a contact surface, wherein the contact surface between the sealing surfaces is limited to a narrow area directly adjacent to the media-carrying area, and has a width of $1/5,000$ to $1/50$ of a nominal width of the sealing system, said contact surface width being between 0.01 and 1 mm, wherein guide sections are provided on both parts, the guide sections situated transversely to and spaced from the sealing surfaces, and wherein, for pre-centering of the two parts, the guide sections have at least one insertion bevel for bringing the two parts together, and a separating gap is formed between the guide sections for aligning the two parts before the sealing surfaces are pressed together, the sealing surfaces having a mutual guidance transverse to the media area walls and being, when pressed together, accurately fitting radially centered to each other, whereby the media-carrying area walls of both parts are truly aligned.

17. The sealing system according to claim 3, wherein the specific sealing pressure is in the range of 20% to 80% of the yield point of the material forming the parts.

18. The sealing system according to claim 5, wherein surface portions of the sealing surfaces are provided as reserve sealing surfaces adjacent to the contact surface, and which have a complimentary design.

19. The sealing system according to claim 18, wherein an annular clearance with a size of $1/15,000$ to $1/500$ of a nominal width of the sealing system is provided between the reserve sealing surfaces.

20. The sealing system according to claim 10, wherein the clearance with is $1/15,000$ to $1/100$ of a nominal width of the sealing system.

21. A detachable sealing system for media-carrying parts comprising:

a seal adjacent to a wall of a media-carrying area, which seals the sealing system when the parts are braced against one another, wherein the parts have mutually precisely complimentary sealing surfaces having cross-sections with a mutually complementary S-shaped profile, which sealing surfaces are directly pressed onto one another to form a clearance-free seal at a contact surface, wherein the contact surface between the sealing surfaces is limited to a narrow area directly adjacent to the media-carrying area, the contact surface and having a width of $1/5,000$ to $1/50$ of a nominal width of the sealing system, and wherein, for pre-centering of the two parts, the guide sections have at least one insertion bevel for bringing the two parts together, and a separating gap is formed between the guide sections for aligning the two parts before the sealing surfaces are pressed together, the sealing surfaces having a mutual guidance transverse to the media area walls and being, when pressed together, accurately fitting radially centered to each other, whereby the media-carrying area walls of both parts are truly aligned, further comprising stop faces between the parts, which form a clearance between the parts before bracing the parts together, whose width is sufficiently large that on bracing the sealing system up to the closing of the clearance, a predetermined sealing pressure is built up by only plastic deformation of the parts.

\* \* \* \* \*